(12) United States Patent
Peeck

(10) Patent No.: US 12,244,221 B2
(45) Date of Patent: Mar. 4, 2025

(54) METHOD AND CIRCUIT ARRANGEMENT FOR CONTROLLING A SWITCHED-MODE POWER SUPPLY

(71) Applicant: WAGO Verwaltungsgesellschaft mbH, Minden (DE)

(72) Inventor: Bernhard Peeck, Wiedensahl (DE)

(73) Assignee: Wago Verwaltungsgesellschaft MBH, Minden (DE)

( * ) Notice: Subject to any disclaimer, the term of this patent is extended or adjusted under 35 U.S.C. 154(b) by 238 days.

(21) Appl. No.: 17/962,226

(22) Filed: Oct. 7, 2022

(65) Prior Publication Data
US 2023/0114055 A1 Apr. 13, 2023

(30) Foreign Application Priority Data
Oct. 12, 2021 (DE) .................... 10 2021 126 399.9

(51) Int. Cl.
*H02M 1/32* (2007.01)
*H02M 1/00* (2006.01)

(52) U.S. Cl.
CPC .......... *H02M 1/32* (2013.01); *H02M 1/0003* (2021.05); *H02M 1/0025* (2021.05)

(58) Field of Classification Search
CPC .... H02M 1/32; H02M 1/0003; H02M 1/0025; H02M 3/335
See application file for complete search history.

(56) References Cited

U.S. PATENT DOCUMENTS

| | | | |
|---|---|---|---|
| 5,451,881 A | 9/1995 | Finger | |
| 6,320,766 B1 | 11/2001 | Park | |
| 7,821,800 B2 * | 10/2010 | Chiang | H02M 1/32 |
| | | | 320/140 |
| 9,941,782 B2 | 4/2018 | Schuermann et al. | |
| 10,056,843 B2 | 8/2018 | Zowislok et al. | |
| 10,425,005 B2 | 9/2019 | Henkel et al. | |

(Continued)

FOREIGN PATENT DOCUMENTS

| | | |
|---|---|---|
| CN | 205793539 U | 12/2016 |
| DE | 102013113648 A1 | 6/2015 |

(Continued)

*Primary Examiner* — Alex Torres-Rivera
(74) *Attorney, Agent, or Firm* — Muncy, Geissler, Olds & Lowe, P.C.

(57) ABSTRACT

A method for controlling a switched-mode power supply having a current limiting control for limiting output current of the switched-mode power supply to a predetermined maximum limiting current value, and having a current boost control for setting the predetermined maximum limiting current value to a predetermined overcurrent value for a predetermined boost time. The output current is passed through a measuring resistor and the measuring voltage, dropping across the measuring resistor, is compared with a first comparison voltage as a measured value proportional to the output current. The first comparison voltage is set to a nominal comparison voltage, correlating with the maximum current value, or to a boost comparison voltage, higher than the nominal comparison voltage and correlating with the higher overcurrent value and the comparison result serves as a control signal limiting the output current to the maximum current value or the overcurrent value.

14 Claims, 4 Drawing Sheets

(56) References Cited

U.S. PATENT DOCUMENTS

| | | | |
|---|---|---|---|
| 2005/0002134 A1 | 1/2005 | Ohtake et al. | |
| 2006/0273740 A1* | 12/2006 | Saeueng | H02J 1/102 |
| | | | 315/291 |
| 2010/0208502 A1* | 8/2010 | Horii | H02M 3/33507 |
| | | | 363/131 |
| 2011/0019316 A1 | 1/2011 | Zhan et al. | |
| 2011/0205770 A1 | 8/2011 | Isogai et al. | |
| 2015/0138851 A1 | 5/2015 | Yonezawa et al. | |
| 2018/0041112 A1* | 2/2018 | Kameyama | H02M 1/32 |
| 2018/0048238 A1* | 2/2018 | Balakrishnan | H02M 3/156 |
| 2018/0269794 A1 | 9/2018 | Arimoto | |
| 2019/0319540 A1 | 10/2019 | Arno | |
| 2020/0412234 A1* | 12/2020 | Hayakawa | H02M 3/156 |
| 2023/0063861 A1* | 3/2023 | Guo | H02M 1/0025 |

FOREIGN PATENT DOCUMENTS

| | | |
|---|---|---|
| DE | 102014105915 A1 | 10/2015 |
| DE | 102015105476 A1 | 10/2016 |
| DE | 102018124191 A1 | 4/2020 |
| DE | 102019101939 A1 | 7/2020 |
| JP | 2016149817 A | 8/2016 |
| WO | WO2016131719 A1 | 8/2016 |

* cited by examiner

METHOD AND CIRCUIT ARRANGEMENT FOR CONTROLLING A SWITCHED-MODE POWER SUPPLY

This nonprovisional application claims priority under 35 U.S.C. § 119(a) to German Patent Application No. 10 2021 126 399.9, which was filed in Germany on Oct. 12, 2021, and which is herein incorporated by reference.

BACKGROUND OF THE INVENTION

Field of the Invention

The present invention relates to a method for controlling a switched-mode power supply having a current limiting control for limiting the output current of the switched-mode power supply to a predetermined maximum limiting current value and having a current boost control for setting the predetermined maximum limiting current value to a predetermined overcurrent value, which is higher than a predetermined maximum current value, for a predetermined boost time. The output current is passed through a measuring resistor and the measuring voltage dropping across the measuring resistor is compared with a first comparison voltage as a measured value proportional to the output current, wherein the first comparison voltage is set to a nominal comparison voltage, correlating with the maximum current value, or to a boost comparison voltage, higher than the nominal comparison voltage and correlating with the higher overcurrent value, and wherein the comparison result serves as a control signal for limiting the output current to either the maximum current value or the overcurrent value.

Description of the Background Art

The invention further relates to a circuit arrangement for controlling a switched-mode power supply having a current limiting control unit, designed to limit the output current of the switched-mode power supply to a predetermined maximum limiting current value, and having a current boost control unit, designed to set the predetermined maximum limiting current value to a predetermined overcurrent value, which is higher than a predetermined maximum current value, for a predetermined boost time. The current boost control unit has a measuring resistor, through which the output current of the switched-mode power supply is passed, and a first comparison unit designed to compare the measuring voltage dropping across the measuring resistor as a measured value, proportional to the output current, with a first comparison voltage. The current boost control unit is designed to set the first comparison voltage to a nominal comparison voltage, correlating with the maximum current value, or to a boosting comparison voltage higher than the nominal comparison voltage and correlating with the higher overcurrent value, wherein the comparison result is supplied to the current limiting control unit as a control signal for limiting the output current to either the maximum current value or the overcurrent value.

Conventional switched-mode power supplies are often equipped with a constant voltage control and a constant current control. The constant voltage control is used to regulate to a constant output voltage until the nominal current of the switched-mode power supply is reached, or just beyond it. If a threshold value of the output current is reached, then the constant current control intervenes and regulates the output voltage down to such an extent that a predetermined maximum current is not exceeded.

Switched-mode power supplies are also known that have at least one current limiting control in order to limit the output current of the switched-mode power supply so that a predetermined maximum current is not exceeded. For this purpose, the output voltage can be regulated down.

When regulating the output current, especially in the event of a drop in the output voltage, a brief significant increase in the output current above the predetermined maximum current is often useful and necessary, for example, in order to be able to reliably trip downstream circuit breakers.

DE 10 2018 124 191 A1 discloses a power supply having a converter unit for providing an output power at the output of the power supply, which is designed to variably adjust a boost output power and/or a boost intermediate time for providing the boost output power at the output of the power supply.

DE 10 2014 105 915 A1, which corresponds to US2017/0054361, describes a power supply unit having an output for outputting an output current and an output voltage and a protective element connected downstream. The power supply unit is designed to reduce an amplitude of the output voltage when the output current exceeds a first amplitude threshold value, and to increase an amplitude of the output current above a second amplitude threshold value in order to interrupt a signal output path for triggering the protective element. The first amplitude threshold value and a predetermined time interval of a short-time current increase are stored in a memory of the power supply unit. The triggering is thus program-controlled with a processor.

DE 10 2015 105 476 A1, which corresponds to US 2017/0338642 discloses a method and a device for supplying power to a low-voltage load. A control logic circuit determines two manipulated variables of a setting apparatus from the magnitude and the time characteristic of a detected output current in order to limit the provided current to a nominal maximum current with a first manipulated variable and to a higher current peak value with a second manipulated variable. A control logic circuit with timers is provided for this purpose.

DE 10 2013 113 648 A1, which corresponds to US 2016/0285356 discloses a power supply device for converting an input voltage into an output voltage, comprising a pulse width modulation circuit and a current limiting circuit which limits an output current first to an increased maximum current for a period of time after a threshold value has been exceeded and thereafter limits it to a regular maximum current. The time period for which the output current is limited to the increased maximum current is variably set depending on the level of the output current. The increased maximum current required to trip an overcurrent protective device connected downstream is therefore not available for a predetermined period of time, and thus possibly too briefly, but, depending on the situation, for a period of time the duration of which is dependent on the level of current flowing in the event of an overcurrent. For this purpose, an integrator circuit is provided having a capacitor as an integration element and at least one charging and/or discharging resistor in a low-pass assembly.

SUMMARY OF THE INVENTION

It is therefore an object of the present invention to provide an improved method and an improved circuit arrangement with which a comparison voltage can be set as a control signal for limiting the output current to either a maximum current value or an overcurrent value with a simple and reliable hardware structure.

In an exemplary embodiment, it is proposed that a constant reference voltage is applied to a voltage divider formed by a series connection of voltage divider resistors, and the first comparison voltage is tapped across a first part of the voltage divider resistors as a constant comparison voltage component dropping across the first part of the voltage divider resistors, and that at least one of the voltage divider resistors is bypassed to set the first comparison voltage to the nominal comparison voltage for limiting the output current of the switched-mode power supply to the predetermined maximum current value.

A circuit arrangement set up to carry out the method can be formed thereby in a simple, reliable, and inexpensive manner from a series circuit of voltage divider resistors as voltage dividers and supplied with a constant reference voltage. The first comparison voltage is then tapped via a first part of the voltage divider resistors and thus has a lower voltage value than the constant reference voltage. The comparison voltage is then set with the aid of the remaining second part of the voltage divider resistors, in that at least one of the voltage divider resistors of the second part can be electrically conductively bypassed with a bypass switch. Thus, the comparison voltage tapped at the first part of the voltage divider resistors can assume two predetermined voltage values when, in one case, the bypass switch is opened and current flows through the unbypassed part of the voltage divider resistors, and, on the other hand, at least one voltage divider resistor of the second part of the voltage divider is bypassed and thus the resistance in the second part of the voltage divider is reduced. The comparison voltage is reduced by the bypassing.

The comparison voltage depends on the constant reference voltage and the resistance ratio in the first and second part of the voltage divider resistors, wherein the voltage divider ratio changes when at least one voltage divider resistor of the second part of the voltage divider is bypassed.

A simple, reliable, and fast-acting control for current limitation either to the maximum current value, predetermined by the constant reference voltage and the ratio of the voltage divider resistors, or to the predetermined overcurrent value is thereby possible.

However, it is also conceivable to bypass at least one voltage divider resistor of the first part of the voltage divider resistors via which the first comparison voltage is tapped. This then results in an inversely operating logic circuit for controlling the bypassing, e.g., by means of a bypass switch, compared to bypassing at least one voltage divider resistor of the second part of the voltage divider via which the comparison voltage is not tapped.

The bypassing can be activated by a comparison of the measuring voltage, proportional to the output current, with a second comparison voltage, which in the unbypassed state of at least one of the voltage dividers correlates with the overcurrent value and in the bypassed state of at least one of the voltage divider resistors correlates with the maximum current value. Then, a delayed bypassing of the at least one voltage divider resistor to set the first comparison voltage to the nominal reference voltage occurs when the measuring voltage is higher than the comparison voltage. The delay can occur due to discharging a first capacitor, which during a discharge phase provides a first switching voltage which is otherwise regulated immediately after detection that the measuring voltage is higher than the second reference voltage and which activates a bypass switch.

Thus, the second comparison voltage is dependent on whether or not the bypass switch is activated to bypass the at least one voltage divider resistor. The detection of an overcurrent thus varies depending on whether or not bypassing occurs.

Thus, for example, in the unbypassed state, a higher second comparison voltage can be present that correlates with the overcurrent value. This initially limits the switched-mode power supply to the overcurrent value. In the event of a brief overload above this overcurrent value, the current is then limited to the maximum current value after the delay time specified by the first capacitor by activating, i.e., switching over, the bypass switch after the delay time has elapsed. This results in the second comparison voltage being reduced to a value correlating with the maximum current.

It is conceivable that after a second delay time has elapsed, the bypass switch is switched off as soon as the output current falls below the maximum current value. Then the first comparison voltage is again set to the overcurrent value.

Such a control is therefore technically feasible without overloading a switched-mode power supply, because after the predetermined maximum current value is exceeded the switched-mode power supply does not operate continuously above the maximum current value but below the overcurrent value, but a current increase above the maximum current value usually also leads immediately to a rapid increase above the overcurrent value. Therefore, initially the monitoring limit can be set to the higher overcurrent value and not necessarily to the lower maximum current value in order to ensure a limitation in continuous operation up to the maximum current value.

However, it is also conceivable that a comparison of the measuring voltage, proportional to the output current, with a second comparison voltage which in the unbypassed state of at least one of the voltage divider resistors correlates with the maximum current value and which in the bypassed state of at least one of the voltage divider resistors correlates with a value lower than the maximum current value. Even then, a delayed bypassing of the at least one voltage divider resistor to set the first comparison voltage to the nominal comparison voltage occurs when the measuring voltage is higher than the comparison voltage. The delay is in turn controlled by discharging a first capacitor, which during a discharge phase provides the first switching voltage which is otherwise regulated immediately after detection that the measuring voltage is higher than the second comparison voltage and which activates a bypass switch.

However, it is also conceivable to compare the measuring voltage, proportional to the output current, with a second comparison voltage, which correlates with the predetermined maximum current value. Then, a delayed bypassing of the at least one voltage divider resistor to set the first comparison voltage to the nominal comparison voltage occurs when the measuring voltage is higher than the second comparison voltage, wherein the delay occurs by discharging a first capacitor which during a discharge phase provides the first switching voltage which is otherwise regulated immediately after detection that the measuring voltage is higher than the second comparison voltage and which activates a bypass switch. In this case, the second comparison voltage is set to be proportional to the predetermined maximum current value. It is advantageous if the second comparison voltage is then kept constant at the predetermined value, regardless of whether the bypass switch is activated or not.

For the above purposes, the circuit arrangement can have a second comparison unit which is designed to compare the measuring voltage, proportional to the output current, with a second comparison voltage.

For example, the second comparison voltage in the unbypassed state of at least one of the voltage divider resistors can correlate with the overcurrent value and in the bypassed state of at least one of the voltage divider resistors with the maximum current value.

The second comparison voltage in the unbypassed state of at least one of the voltage divider resistors can correlate with the maximum current value and in the bypassed state of at least one of the voltage divider resistors with a value lower than the maximum current value.

The second comparison voltage can also correlate with the predetermined maximum current value. In this case, it can vary depending on the activation of the bypass switch or, preferably, it can also be constant independently of the activation of the bypass switch.

In all examples of the second comparison unit with the determination of the second comparison voltage, the current boost control unit can have a first delay circuit with a first capacitor. In this case, the current boost control unit can be designed for delayed bypassing of the at least one voltage divider resistor to set the first comparison voltage to the first nominal comparison voltage when the measuring voltage is higher than the comparison voltage. The delay is caused by discharging the first capacitor, which during a discharge phase provides a switching voltage for activating the bypass switch, which after discharging the capacitor or without the capacitor is regulated to such an extent that the bypass switch is switched off and the at least one voltage divider resistor is thus not bypassed.

When the switching voltage is applied to the bypass switch, in contrast, the switch is closed so that the at least one voltage divider resistor is bypassed.

However, the inverse switching principle is also conceivable, in which the bypass switch is open when a first switching voltage is applied, and the bypass switch is triggered and the at least one voltage divider resistor is not bypassed. The control logic circuit must then be designed inverted accordingly.

To prevent excessive heating of the switched-mode power supply or overloading after operation with the overcurrent value, it is advantageous if a further switching logic circuit is connected upstream of the bypass switch, wherein the second switching voltage for the bypass switch is maintained with a second capacitor during a discharge time of the second capacitor when the upstream first switch transitions from the open to the closed state and the second switching voltage would otherwise decrease. This can prevent a current increase to the overcurrent value for a blocking time predetermined by the discharge time of the second capacitor.

The first switch and the bypass switch can be operated inverted so that the bypass switch is open per se when the first switch is closed and, conversely, the bypass switch is closed when the first switch is open.

For example, to activate the current boost control unit with such a blocking time, the current boost control unit can have a first switch, wherein the bypass switch is connected downstream of the first switch in an inverse-switched manner so that the bypass switch is closed to bypass the at least one voltage divider resistor when the first switch is open. The current boost control unit can further have a second delay circuit with a second capacitor, which is designed to maintain a second switching voltage, sufficient for switching the bypass switch, for the bypass switch with the second capacitor during a discharge time of the second capacitor when the first switch transitions from the open state to the closed state and the second switching voltage would otherwise decrease. This can prevent a current increase to the overcurrent value for a blocking time predetermined by the discharge time of the second capacitor.

For example, the first delay circuit can be a parallel circuit to the first capacitor and an ohmic resistor. In a similar way, the second delay circuit can have a parallel circuit to the second capacitor and an ohmic resistor. Such an integrator circuit with a capacitor and at least one charging and/or discharging resistor in a low-pass arrangement determines the respective delay time by suitable dimensioning of the component values, i.e., the ohmic resistance and the capacitance. Consequently, the delay can be predetermined structurally.

A diode can be connected in each case upstream of the first and second delay circuit in the forward direction. This achieves a suppression of negative voltage values in the manner of a rectification. Discharge of capacitors via the circuit upstream of the respective diode is prevented.

It is particularly advantageous if a voltage limiting control is provided which is designed to limit the output voltage of the switched-mode power supply to a predetermined maximum nominal voltage. Then the constant voltage control acting during normal operation can be superimposed by the constant current control acting to limit the output power to the maximum current value in continuous operation.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
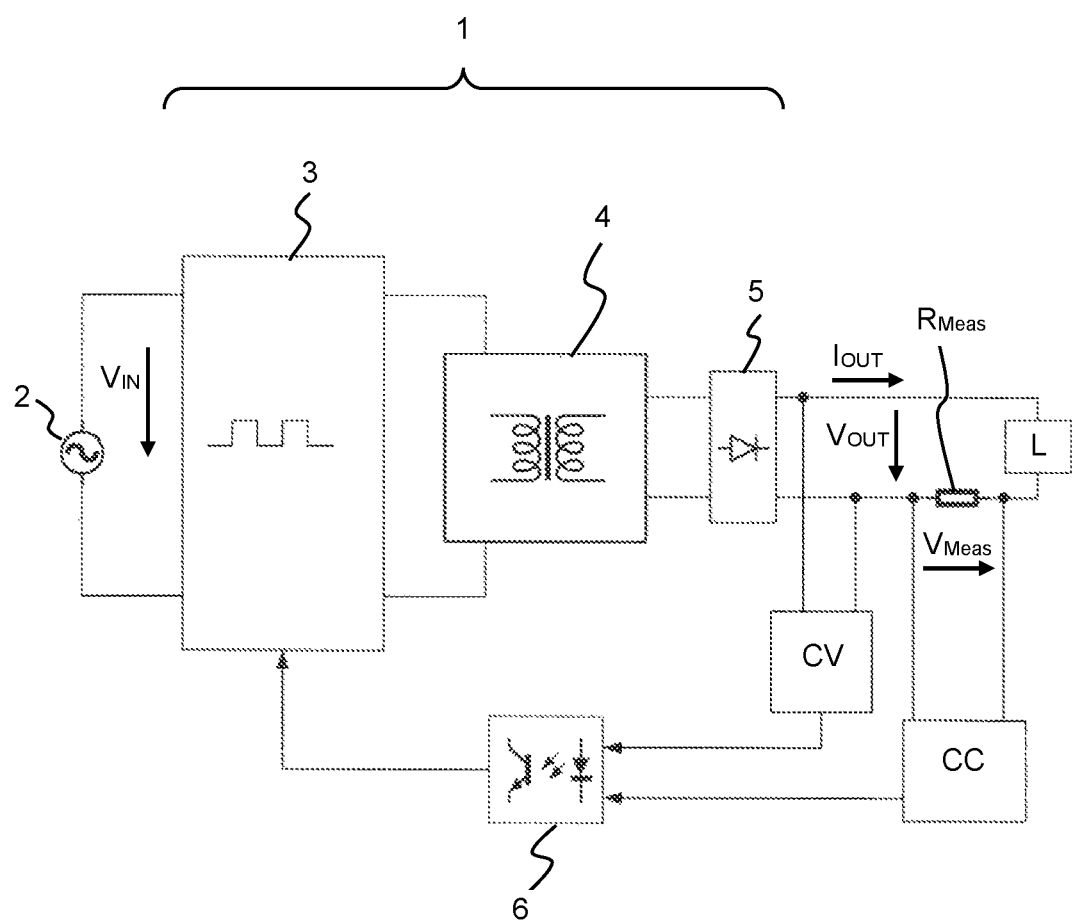
FIG. 1 shows a block diagram of a switched-mode power supply with constant voltage and constant current control.

FIG. 1 shows a block diagram of a switched-mode power supply 1, which is supplied with electrical power from an input voltage source 2. The input voltage VIN can be a DC or AC voltage, depending on the downstream switched-mode power supply electronics 3. The input voltage VIN is supplied conditioned and pulsed to a transformer 4. Next, the voltage is rectified by a rectifier 5 and provided as output voltage VOUT to the output of switched mode power supply 1 at which a load L can be operated.

A constant voltage regulation unit CV is clamped to the output of switched-mode power supply 1, so that the output voltage $V_{OUT}$ is applied to the input of the constant voltage regulation unit CV. This unit monitors the output voltage $V_{OUT}$ and compares it to a maximum nominal voltage $V_{Max}$. If the output voltage $V_{OUT}$ rises above the predetermined target nominal voltage $V_{Max}$, a current is allowed to flow through the diode side of an optocoupler 6, so that a current also flows on its transistor side, which is on the primary side of switched-mode power supply 1. This control current forms a control signal with which switched-mode power supply 1 is controlled so that the output voltage $V_{OUT}$ is kept constant at the predetermined setpoint value $V_{Max}$.

If the load L demands an output current $I_{OUT}$ that is above a predetermined maximum current value $I_{Max}$, a constant current control unit CC detects this. For this purpose, the output current $I_{OUT}$ can be passed through a measuring resistor $R_{Meas}$, across which a measuring voltage $V_{Meas}$ drops. This measuring voltage $V_{Meas}$ is compared with a nominal comparison voltage correlating with the predetermined maximum current value $I_{Max}$. When the measuring voltage $V_{meas}$ exceeds the nominal comparison voltage, the constant current control unit CC intervenes and causes a current to flow through the diode side of optocoupler 6, so that a control signal is generated on the transistor side of optocoupler 6 by the current flow for switched-mode power supply 1. Depending on the control signal, this reduces the voltage to such an extent that the output current $I_{OUT}$, i.e., the load current, is kept at the preset threshold.

However, the comparison of the measuring voltage $V_{Meas}$ and the control by the constant current control unit CC not only controls the output current $I_{OUT}$ to the predetermined maximum current value, but also provides for a temporary power boost by limiting the output current $I_{OUT}$ to a higher overcurrent value for a maximum delay time $t_{Boost}$.

The structure of the constant current control unit CC and the control method become clearer from the following figures.

Figure 2:
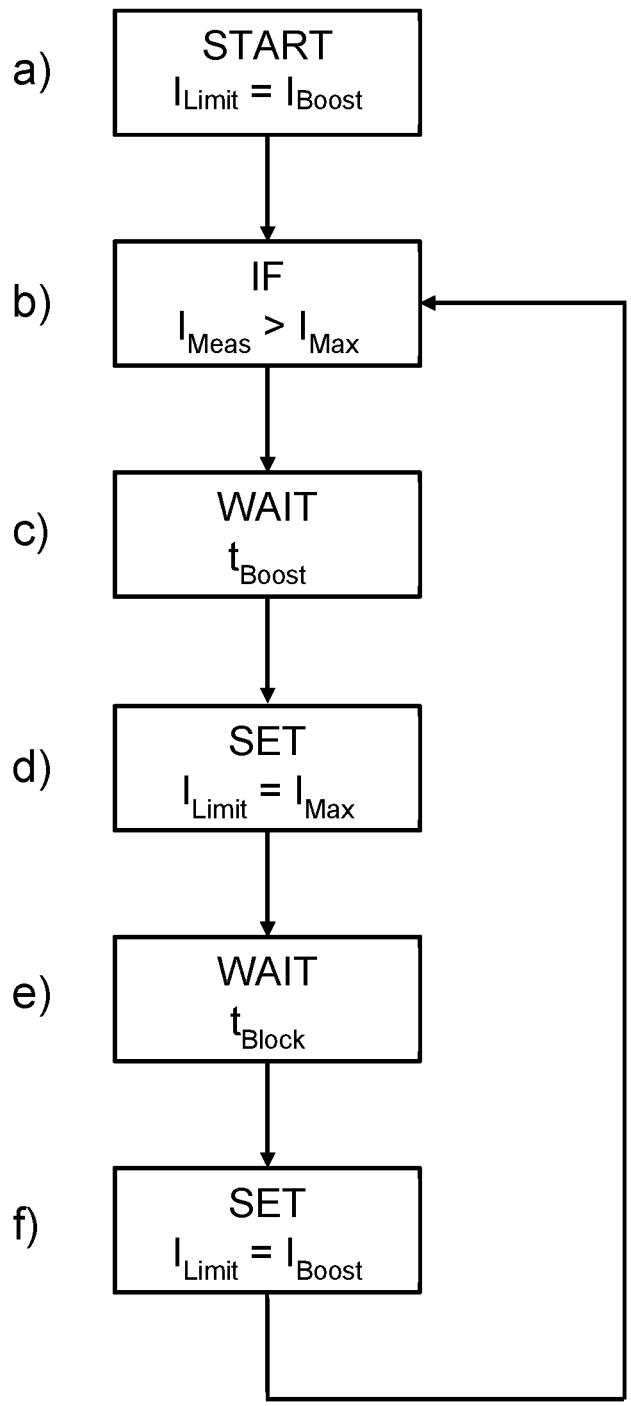
FIG. 2 shows a flowchart of the method for controlling a switched-mode power supply.

FIG. 2 shows a flowchart of the method for controlling switched-mode power supply 1 with a current limiting control for limiting the output current $I_{OUT}$ of switched-mode power supply 1 to a predetermined maximum limiting current value.

This limiting current value $I_{Limit}$ is set at the beginning, for example, to a predetermined overcurrent value $I_{Boost}$.

During operation, the output current $I_{OUT}$ as the measuring current $I_{Meas}$ flowing through the measuring resistor $R_{Meas}$ or its proportional measuring voltage $V_{Meas}$, which drops across a measuring resistor $R_{Meas}$, is then continuously compared with a first comparison voltage $V1_{Comp}$ or the proportional comparison current $I_{Comp}$. If the measuring current $I_{Meas}$ is greater than the predetermined maximum current value $I_{Max}$, i.e., if the measuring voltage $V_{Meas}$ dropping with respect to the measuring resistor $R_{Meas}$ is greater than the first comparison voltage $V1_{Comp}$ set to the maximum current value $V_{Max}$, switched-mode power supply 1 is controlled so that the output current $I_{OUT}$ is limited to the overcurrent value $I_{Boost}$ for a maximum predetermined overload time $t_{Boost}$. Switched-mode power supply 1 can thus still provide the required output power, for example, to switch off a safety protection system. With the help of a limitation of the overload time $t_{Boost}$, an overload of switched-mode power supply 1 during operation above the predetermined nominal power with the maximum current value $I_{Max}$ is prevented.

Thus, after an exceeding of the maximum current value $I_{Max}$ has been detected, the system waits until the overload time $t_{Boost}$ has elapsed. Next, the first comparison voltage $V1_{Comp}$ or the maximum limiting current value $I_{Limit}$ proportional thereto is set to the maximum current value $I_{Max}$. This controls switched-mode power supply 1 so that the output current $I_{OUT}$ is limited to the predetermined maximum current value $I_{Max}$.

Resetting of the first comparison voltage $V1_{Comp}$ to the predetermined overcurrent value is then prevented for a blocking time $t_{Block}$. Thus, the system waits at least until the blocking time $t_{Block}$ has elapsed before the first comparison voltage $V1_{Comp}$ is again set to the boost comparison voltage to reset the maximum limit current value $I_{Limit}$ to the overcurrent value $I_{Boost}$.

Switched-mode power supply 1 can thereby output a higher output current $I_{OUT}$ than the predetermined maximum current value $I_{Max}$, when demanded by the load.

The current boost control then again continuously checks whether the measuring current $I_{Meas}$ is greater than the predetermined maximum current value $I_{Max}$, i.e., whether the measuring voltage $V_{Meas}$ dropping across the measuring resistor $I_{Max}$ is greater than a second comparison voltage that correlates with the maximum current value $I_{Max}$.

Then the method is continued iteratively in the manner described above.

Figure 3:
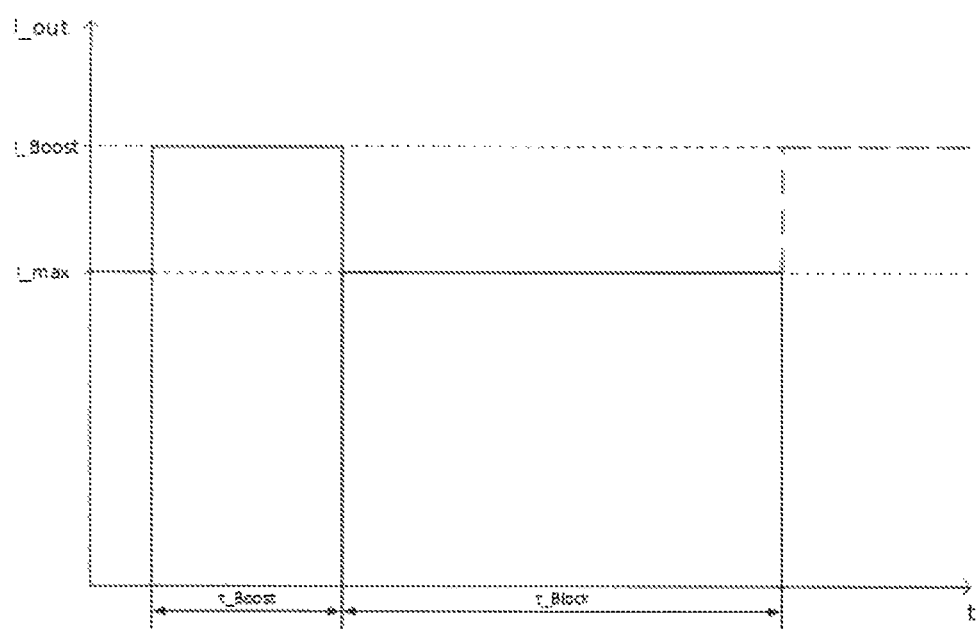
FIG. 3 shows an exemplary current diagram versus the time of the regulated output current of the switched-mode power supply.

The course of the current limiting control CC becomes clearer from the current diagram of the output current $I_{OUT}$ over time t with reference to FIG. 3.

If the output current $I_{OUT}$ exceeds the maximum current value $I_{Max}$, this is initially allowed because the maximum limiting current value is set to a predetermined overcurrent value Boost (step a) in FIG. 2). For this purpose, a second comparison voltage $V2_{Comp}$ is predetermined such that it correlates either with the overcurrent value $I_{Boost}$ or the maximum current value $I_{Max}$. Thus, as described by way of example in step b), limiting the output current $I_{OUT}$ to the overcurrent value $I_{Boost}$ is possible when the output current $I_{OUT}$ exceeds the overcurrent value $I_{Max}$. This setting of the maximum limiting current value $I_{Limit}$ by the first comparison voltage $V1_{Comp}$, which is correlated with the overcurrent value $I_{Boost}$, is only allowed for a limited boost time $t_{Boost}$. After the boost time $t_{Boost}$ has elapsed, which starts when the output current $I_{OUT}$ exceeds the maximum current value $I_{Max}$, the maximum limiting current value Limit is reduced to the maximum current value $I_{Max}$ by setting the first comparison voltage $V1_{Comp}$. The output current $I_{OUT}$ of switched-mode power supply 1 is thus limited to the overcurrent value $I_{Max}$. This setting is maintained during a blocking time $t_{Block}$ so that the maximum limiting current value $I_{Limit}$ is kept at the predetermined maximum current value $I_{Max}$. This ensures that switched-mode power supply 1 is not operated above the predetermined nominal power with the overcurrent value $I_{Boost}$ too frequently or for too long for the design, and the components are thereby overloaded. It is also ensured with the aid of the blocking time $t_{Block}$ that switched-mode power supply 1 can cool down after the overload operation with the overcurrent value $I_{Boost}$.

After the blocking time $t_{Block}$ has elapsed, the maximum limiting current value $I_{Limit}$ is reset again in step f) to the predetermined overcurrent value $I_{Boost}$, so that switched-mode power supply 1 can then also be operated again at an output nominal power above the maximum current value $I_{Max}$ and the nominal comparison voltage correlating therewith, but only for a predetermined boost time $t_{Boost}$.

The entry into this next boost phase depends on the power demanded by the load L. Thus, it is also conceivable that the output current $I_{OUT}$ drops below the maximum current value $I_{Max}$ before the described phase or during the blocking time $t_{Block}$. The increase in the output current $I_{OUT}$ to the overcurrent value $I_{Boost}$ also does not need to occur directly after the blocking time $t_{Block}$ has elapsed.

The threshold, i.e., the maximum limiting current value $I_{Limit}$ for the output current $I_{OUT}$ can thereby be set to a higher overcurrent value $I_{Boost}$. After a certain boost time $t_{Boost}$, the circuit then intervenes in the overcurrent control and lowers the maximum output current $I_{OUT}$ to the maximum current $I_{Max}$ of switched-mode power supply 1, which can be output continuously. In addition, after the outputting of a boost, i.e., the overcurrent value $I_{Boost}$, the outputting of another overcurrent value $I_{Boost}$ within a short time is prevented. A too frequent boost output could overload switched-mode power supply 1 and thus result in damage. Therefore, after each overcurrent value $I_{Boost}$, the boost function is blocked for a certain blocking time $t_{Block}$.

The level of boost current $I_{Boost}$, the boost time $t_{Boost}$, and the blocking time $t_{Block}$ between possible boosts can be adjusted in the hardware by coordinating component values of individual components of an electronic circuit. This can be implemented completely as a discrete circuit in a reliable, simple, and inexpensive way without program-controlled microcontrollers.

Figure 4:
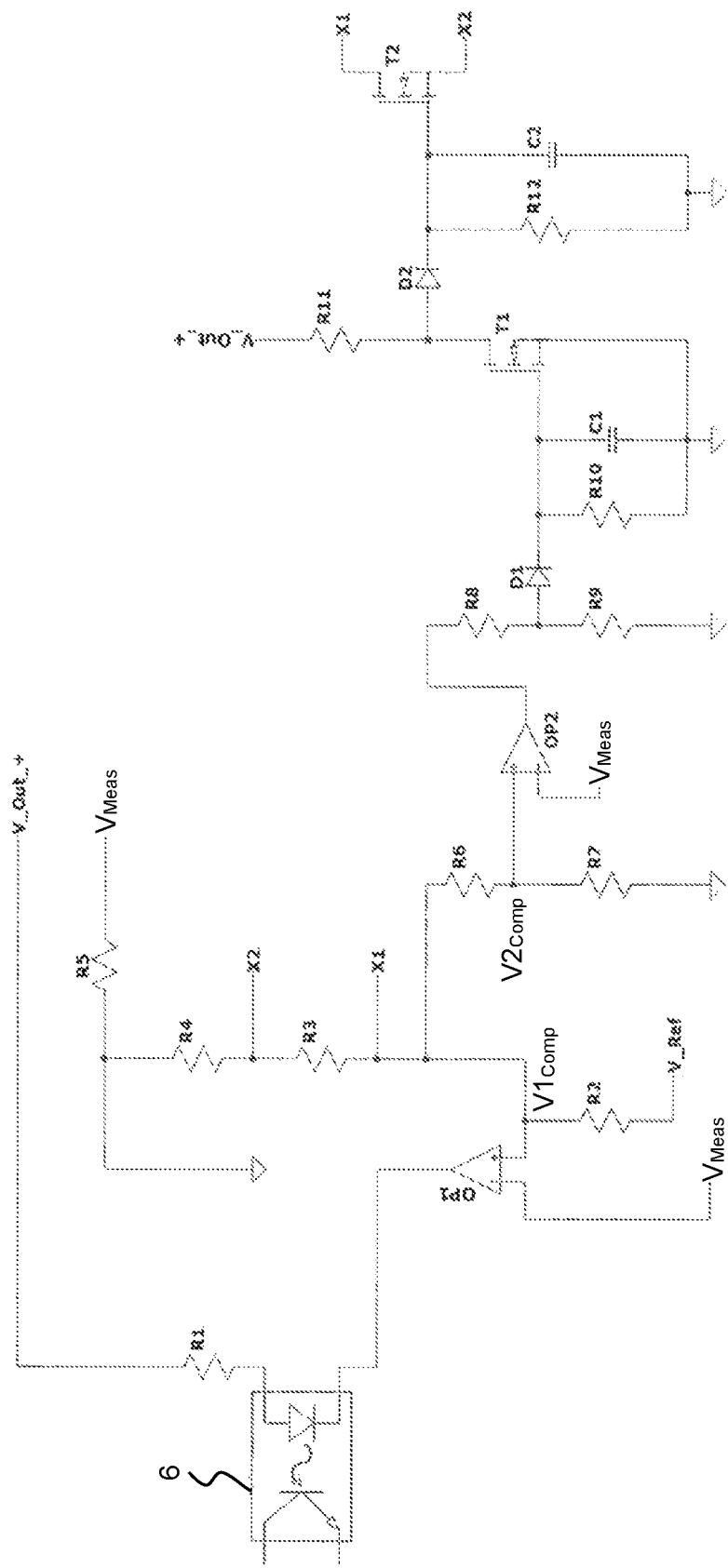
FIG. 4 shows an exemplary circuit diagram of a circuit arrangement for controlling a switched-mode power supply.

An exemplary circuit diagram of the circuit arrangement for controlling a switched-mode power supply 1 is shown in FIG. 4.

Optocoupler 6 sketched in FIG. 1 for outputting the control signal for switched-mode power supply 1 is shown on the left and is activated by a first optocoupler as the first comparison unit OP1 and is operated via a first ohmic resistor R1 via the output voltage $V_{OUT+}$.

The measuring voltage $V_{Meas}$, which drops across the measuring resistor $R_{Meas}$, is applied to an input of the first comparison unit OP1. This is compared with a first comparison voltage $V1_{Comp}$, which is tapped via a part of a voltage divider formed by a series connection of voltage divider resistors R2, R3, R4. A constant reference voltage $V_{Ref}$ is applied to the voltage divider.

As regarded from this voltage potential $V_{Ref}$, the first comparison voltage $V1_{Comp}$ is tapped via the voltage divider resistor R2. As regarded from the base potential GND, the reference voltage $V_{Comp}$ is tapped via the voltage divider resistors R3 and R4. For the first comparison unit OP1 the relative observation is irrelevant that it is always a matter of the difference between the voltage potential between $V_{Meas-}$ and $V1_{Comp}$.

The measuring resistor $R_{Meas}$ corresponds to the ohmic resistor R5. A current flows through this resistor, so that the measuring voltage $V_{Meas}$ drops to the base potential across the measuring resistor $R_{Meas}$. The base potential or the ground GND is marked with a triangle or an arrowhead in the customary manner.

The voltage divider resistor R3 of the second part of the voltage divider can be bypassed via the taps X1, X2. For this purpose, the circuit arrangement has a bypass switch T2 whose output is connected to the two taps X1, X2. The bypass switch T2 can be a relay or a switching transistor as shown.

In the voltage divider, the further constant ohmic resistors R6 and R7 are still active, which are connected to an input of a second comparison unit OP2 (operational amplifier). This series connection of the ohmic resistors R6, R7 is connected, on the one hand, to the input of the first comparison voltage $V1_{Comp}$ at the first comparison unit OP1 and, on the other hand, to the base potential GND and thus connected in parallel to the series connection of the ohmic voltage divider resistors R3, R4. Thus, the first comparison voltage $V1_{Comp}$ is also determined by these two ohmic resistors R6, R7. This must be taken into account when dimensioning the component values, but is irrelevant in operation, because the ohmic resistors R6, R7 are constant and there is no load-dependent variation of the current flowing through them.

By dimensioning these voltage divider resistors R2, R3, R4, R6 and R7, two predetermined values for the first comparison voltage $V1_{Comp}$ can thus be specified, namely, on the one hand, for the unbypassed state of the voltage divider resistor R3 and, on the other hand, for the bypassed state of the voltage divider resistor R3.

The measuring resistor R5 is a low-ohmic resistor through which the output current $I_{OUT}$ flows. If the output current $I_{OUT}$ increases, the voltage $V_{OUT-}$ dropping across this measuring resistor $R_{Meas}$ or R5 also increases, which is applied as a measuring voltage $V_{Meas}$, proportional to the output current $I_{OUT}$, to a comparison input of the first comparison unit OP1 and compared with the first comparison unit OP1 with the first comparison voltage $V1_{Comp}$. This is generated from the constant reference voltage $V_{Ref}$ by means of the voltage divider and set either to a nominal comparison voltage, correlating with a predetermined maximum current value $I_{Max}$, or to a boost comparison voltage, correlating with the predetermined overcurrent value $I_{Boost}$.

If the measuring voltage $V_{Meas}$ exceeds a threshold value predetermined by the first comparison voltage $V1_{Comp}$, the constant current control CC becomes active and controls the output voltage $V_{OUT}$ of switched-mode power supply 1 downwards such that the predetermined maximum limiting current value $I_{Limit}$ is not exceeded.

The maximum limiting current value $I_{Limit}$ or the first comparison voltage $V1_{Comp}$ correlating therewith is higher, the greater the voltage divider part formed by the series connection of the voltage divider resistors R3, R4. In the unbypassed state of the voltage divider resistor R3, the first comparison voltage $V1_{Comp}$ is thus set to the value of the boost comparison voltage, which correlates with the overcurrent value $I_{Boost}$.

To limit an overcurrent operation Boost with the overcurrent value $I_{Boost}$ to a maximum boost time $t_{Boost}$, the subsequent circuit connected through the voltage divider resistors R6 and R7 and to their common junction enables the voltage divider resistor R3 to be bypassed after the boost time $t_{Boost}$ has elapsed, and thereby to limit the allowed output current $I_{OUT}$ to a lower predetermined maximum current value $I_{Max}$ compared to the overcurrent value $I_{Boost}$.

For this purpose, a second comparison unit OP2 (e.g., operational amplifier) is used to compare the measuring voltage $V_{Meas}$, which drops across the measuring resistor R5, with a second comparison voltage $V2_{Comp}$, which is also derived from the reference voltage $V_{Ref}$. If no overload is present, the second comparison unit OP2 switches a subsequent first switch T1 so that the switching output is electrically conductively bypassed. The first switch T1 can be implemented, for example, as a transistor as shown or as a relay or other electronic switch. When the first switch T1 is closed in this way, the input of a second diode D2 is at ground potential and accordingly no voltage is applied across the input of the overload switch T2. This overload switch T2 is then open. Thus, the first switch T1 and the subsequent overload switch T2 operate with an interdependent inverse logic. When the first switch T1 is open, a voltage potential determined by the output voltage $V_{OUT}$, the ohmic resistor R11 and another ohmic resistor R12 and a second capacitor C2 is then applied at the bypass switch T2. The parallel circuit comprising the further ohmic resistor R12 and the second capacitor C2 forms an integrator circuit, which is clamped to ground on one side and to the switching input of the overcurrent switch T2 with the other connection point. It forms a voltage divider with the ohmic resistor R11, said divider which is operated with the output voltage $V_{OUT}$. The second diode D2 is connected upstream in the forward direction of the second delay circuit formed by the ohmic resistor R12 and the second capacitor C2.

The output of the second comparison unit OP2 is connected to a second voltage divider formed by the series connection of ohmic resistors R8 and R9. This second voltage divider is optional. It is useful, however, to regulate the output voltage of the second comparison unit OP2 down to a suitable voltage adapted for switching the first switch T1. If necessary, the first diode D1 can also optionally be connected in the forward direction to the junction point between the voltage divider resistors R8 and R9 in order to ensure rectification and to eliminate interfering current peaks when switching over.

If now the measuring voltage $V_{Meas}$ exceeds the second comparison voltage $V2_{Comp}$, the second comparison unit OP2 switches off the voltage at the first switch T1. However, the switching input is still supported by the first capacitor C1, which together with an ohmic resistor R10 connected in parallel forms a first delay circuit. Thus, even after the second comparison unit OP2 has been switched off, the first switch T1 is still kept in the conductive state for a predetermined boost time $t_{Boost}$. For this purpose, the use of a transistor as the first switch, whose gate forms the switching input, is suitable.

The first capacitor C1 is slowly discharged via the ohmic resistor R10. The component values for the first capacitor C1 and the ohmic resistor R10 determine the delay time $t_{Boost}$. After this boost time $t_{Boost}$ has elapsed, the voltage at the first switch T1, i.e., at the gate, for example, has dropped to such an extent that the first switch T1 switches off.

The boost time $t_{Boost}$ can be set by varying the component values for the ohmic resistor R10 and the first capacitor C1 and can be predetermined at the factory.

When the first switch T1 now opens after the boost time $t_{Boost}$ has elapsed, a voltage is now applied to the bypass switch T2, which voltage is formed from the voltage divider of the ohmic resistors R11 and R12. As a result, the bypass switch T2 switches to the conductive state and bypasses the voltage divider resistor R3 of the first voltage divider. This has the result that the first comparison voltage $V1_{Comp}$, which correlates with the maximum limiting current value $I_{Limit}$, is set to the predetermined maximum current value $I_{Max}$, i.e., the nominal comparison voltage correlating therewith.

After the elapse of the boost time $t_{Boost}$ and of the related switching over of the first comparison voltage $V1_{Comp}$ and the current limitation to the maximum current value $I_{Max}$, the second comparison unit OP2 can switch on again and supply a voltage to the output if the measuring voltage $V_{Meas}$ is lower than the second comparison voltage $V2_{Comp}$. This usually occurs directly after bypassing the voltage divider resistor R3 while reducing the first comparison voltage $V1_{Comp}$. The first switch T1 is thereby again switched to the conductive state and the first delay circuit is charged again to give the measurement cycle a new boost time $t_{Boost}$.

Switching the first switch T1 on again would cause the switching voltage at the gate of the bypass switch T2 to drop, so that the bypassing of the current divider resistor R3 would then be removed and the maximum limiting current value $I_{Limit}$ would be set to the overcurrent value $I_{Boost}$.

However, this is prevented by the second delay unit, which supports the gate of the bypass switch T2 by the second capacitor C2 for a blocking time $t_{Block}$. This second capacitor C2 is slowly discharged by the ohmic resistor R12 connected in parallel, so that the bypass switch T2 only becomes conductive again after the blocking time $t_{Block}$ has elapsed. The second diode D2 in this case prevents a fast discharge of the second capacitor C2 via the first switch T1.

The blocking time $t_{Block}$ can also be set by varying the component values of the ohmic resistor R12 and the second capacitor C2 and can be predetermined at the factory.

The times for the boost time $t_{Boost}$ and the blocking time $t_{Block}$ can be varied over a very wide range. Times from less than 1 second to a number of minutes are possible.

The series connection of the voltage divider resistors R3 and R4 can be extended by further resistors. Additional resistors can be bypassed in this case, wherein the circuit parts described for bypassing can be executed repeatedly to bypass the further voltage divider resistors in a time-limited manner. This allows a multi-stage boost, i.e., a multi-stage increase of the limiting current value to a respective overcurrent value. In this way, the overcurrent values can assume a number of different predetermined values which depend on the component values of the voltage divider resistors and, in particular, on the component values of the respective bypassed voltage divider resistors.

The described circuit arrangement makes it possible to achieve a boost in switched-mode power supplies with inexpensive components. It is thereby possible that a switched-mode power supply 1 continues to be operated without immediate limitation when certain loads that draw an increased starting current are turned on. These include, on the one hand, devices with large input capacitance or electric motors. On the one hand, a briefly increased output current can enable such loads to start up more quickly. On the other hand, this can prevent the output voltage from briefly dropping when these loads are switched on. This could negatively affect other parallel loads.

The boost with the limitation of the power of switched-mode power supply 1 for a limited boost time to a higher overcurrent value can also be used to safely trip (electronic) circuit breakers between switched-mode power supply 1 and load L. The boost can thereby eliminate the need to oversize switched-mode power supply 1 to provide a sufficient trip current.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for controlling a switched-mode power supply comprising a current limiting control to limit an output current of the switched-mode power supply to a predetermined maximum limiting current value and comprising a current boost control for setting the predetermined maximum limiting current value to a predetermined overcurrent value, which is higher than a predetermined maximum current value for a predetermined boost time, the method comprising:

passing the output current through a measuring resistor;

comparing a measuring voltage dropping across the measuring resistor with a first comparison voltage as a measured value proportional to the output current;

setting the first comparison voltage to a nominal comparison voltage correlating with the predetermined maximum current value or to a boost comparison voltage higher than the nominal comparison voltage and correlating with the predetermined overcurrent value;

using the comparison result as a control signal for limiting the output current to either the predetermined maximum current value or the predetermined overcurrent value;

applying a constant reference voltage to a voltage divider which is formed by a series connection of voltage divider resistors;

tapping the first comparison voltage across a first part of the voltage divider resistors as a component of the constant reference voltage dropping across the first part of the voltage divider resistors; and bypassing at least one of the voltage divider resistors to set the first comparison voltage to the nominal comparison voltage for limiting the output current of the switched-mode power supply to the predetermined maximum current value.

2. The method according to claim 1, further comprising:
comparing the measuring voltage, proportional to the output current, with a second comparison voltage which, in an unbypassed state of at least one of the voltage divider resistors correlates with the predetermined overcurrent value and which, in the bypassed state of at least one of the voltage divider resistors, correlates with the predetermined maximum current value; and delaying bypassing the at least one voltage divider resistor to set the first comparison voltage to the nominal comparison voltage when the measuring voltage is higher than the second comparison voltage, wherein the delay occurs by discharging a first capacitor which during a discharge phase provides a first switching voltage which is otherwise regulated immediately after detection that the measuring voltage is higher than the second comparison voltage and which activates a bypass switch.

3. The method according to claim 2, further comprising:
activating a first switch with the first switching voltage, wherein the bypass switch is connected inversely downstream of the first switch so that the bypass switch is closed to bypass the at least one voltage divider resistor when the first switch is open, and so that the second switching voltage for the bypass switch is maintained with a second capacitor during a discharge time of the second capacitor when the first switch transitions from an open state to a closed state and the second switching voltage would otherwise decrease, in order to prevent a current increase to the predetermined overcurrent value for a blocking time predetermined by the discharge time of the second capacitor.

4. The method according to claim 1, further comprising:
comparing the measuring voltage proportional to the output current with a second comparison voltage which, in an unbypassed state of at least one of the voltage divider resistors, correlates with the predetermined maximum current value and which, in a bypassed state of at least one of the voltage divider resistors, correlates with a value lower than the predetermined maximum current value; and delaying bypassing the at least one voltage divider resistor to set the first comparison voltage to the nominal comparison voltage when the measuring voltage is higher than the second comparison voltage, wherein the delay occurs by discharging a first capacitor which during a discharge phase provides a first switching voltage which is otherwise regulated immediately after detection that the measuring voltage is higher than the second comparison voltage and which activates a bypass switch.

5. The method according to claim 1, further comprising:
comparing the measuring voltage proportional to the output current with a second comparison voltage, which correlates with the predetermined maximum current value; and delaying bypassing of the at least one voltage divider resistor to set the first comparison voltage to the nominal comparison voltage when the measuring voltage is higher than the second comparison voltage, wherein the delay occurs by discharging a first capacitor which during a discharge phase provides a first switching voltage which is otherwise regulated immediately after detection that the measuring voltage is higher than the second comparison voltage and which activates a bypass switch.

6. The method according to claim 1, further comprising:
controlling the switched-mode power supply with a voltage limiting control for limiting an output voltage of the switched-mode power supply to a predetermined maximum nominal voltage.

7. A circuit arrangement for controlling a switched-mode power supply comprising:
a current limiting control unit designed to limit an output current of the switched-mode power supply to a predetermined maximum limiting current value;

a current boost control unit designed to set the predetermined maximum limiting current value to a predetermined overcurrent value higher than a predetermined maximum current value for a predetermined boost time, wherein the current boost control unit has a measuring resistor through which the output current of the switched-mode power supply is passed; and a first comparison unit designed to compare a measuring voltage dropping across the measuring resistor as a measured value, proportional to the output current, with a first comparison voltage, wherein the current boost control unit is designed to set the first comparison voltage to a nominal comparison voltage, correlating with the predetermined maximum current value or to a boost comparison voltage higher than the nominal comparison voltage and correlating with the predetermined overcurrent value, wherein the comparison result is supplied to the current limit control unit as a control signal for limiting the output current to either the predetermined maximum current value or the predetermined overcurrent value, wherein the current boost control unit has a voltage divider which is formed by a series connection of voltage divider resistors and which is supplied with a constant reference voltage, wherein the first comparison voltage is tapped across a first part of the voltage divider resistors as a component of the constant reference voltage dropping across the first part of the voltage divider resistors, and wherein a bypass switch electrically conductively bypasses at least one of the voltage divider resistors in order to set the first comparison voltage to the predetermined maximum current value for limiting to the predetermined maximum current value during bypassing.

8. The circuit arrangement according to claim 7, further comprising a second comparison unit which is designed to compare the measuring voltage proportional to the output current with a second comparison voltage which, in an unbypassed state of at least one of the voltage divider resistors, correlates with the predetermined overcurrent value and which, in a bypassed state of at least one of the voltage divider resistors, correlates with the predetermined maximum current value,
- wherein the current boost control unit has a first delay circuit with a first capacitor and is designed to delay bypassing of the at least one voltage divider resistor to set the first comparison voltage to the nominal comparison voltage when the measuring voltage is higher than the comparison voltage, and
- wherein the delay occurs by discharging the first capacitor which during a discharge phase provides a first switching voltage which is otherwise regulated immediately after detection that the measuring voltage is higher than the second comparison voltage and which activates the bypass switch.

9. The circuit arrangement according to claim 7, further comprising a second comparison unit, which is designed to compare the measuring voltage, proportional to the output current, with a second comparison voltage which, in an unbypassed state of at least one of the voltage divider resistors correlates with the predetermined maximum current value and which, in a bypassed state of at least one of the voltage divider resistors, correlates with a value lower than the predetermined maximum current value,
- wherein the current boost control unit has a first delay circuit with a first capacitor and is designed to delay bypassing of the at least one voltage divider resistor to set the first comparison voltage to the nominal comparison voltage when the measuring voltage is higher than the second comparison voltage,
- wherein the delay occurs by discharging the first capacitor which during a discharge phase provides a first switching voltage which is otherwise regulated immediately after detection that the measuring voltage is higher than the second comparison voltage and which activates the bypass switch.

10. The circuit arrangement according to claim 7, further comprising a second comparison unit, which is designed to compare the measuring voltage, proportional to the output current, with a second comparison voltage correlated with the predetermined maximum current value,
- wherein the current boost control unit has a first delay circuit with a first capacitor and is designed to delay bypassing of the at least one voltage divider resistor to set the first comparison voltage to the nominal comparison voltage when the measuring voltage is higher than the second comparison voltage,
- wherein the delay occurs by discharging the first capacitor which during a discharge phase provides a first switching voltage which is otherwise regulated immediately after detection that the measuring voltage is higher than the second comparison voltage and which activates the bypass switch.

11. The circuit arrangement according to claim 7, wherein the current boost control unit has a first switch, wherein the bypass switch is connected downstream of the first switch in an inverse-switched manner so that the bypass switch is closed to bypass the at least one voltage divider resistor when the first switch is open, and wherein the current boost control unit has a second delay circuit with a second capacitor, which is designed to maintain a second switching voltage, sufficient for switching the bypass switch with the second capacitor during a discharge time of the second capacitor when the first switch transitions from an open state to a closed state and the second switching voltage would otherwise decrease, in order to prevent an increase in the output current to the predetermined overcurrent value for a blocking time predetermined by the discharge time of the second capacitor.

12. The circuit arrangement according to claim 7, further comprising a voltage limiting control to limit an output voltage of the switched-mode power supply to a predetermined maximum nominal voltage.

13. The circuit arrangement according to claim 11, wherein the first delay circuit has a parallel circuit comprising the first capacitor and an ohmic resistor and/or the second delay circuit has a parallel circuit comprising the second capacitor and an ohmic resistor.

14. The circuit arrangement according to claim 13, wherein a diode is connected upstream of the first and/or second delay circuit in a forward direction.

* * * * *